(12) United States Patent
Matsushita

(10) Patent No.: US 6,776,333 B2
(45) Date of Patent: Aug. 17, 2004

(54) CUSTOMER MANAGEMENT SYSTEM

(75) Inventor: Naohiro Matsushita, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/099,426

(22) Filed: Mar. 15, 2002

(65) Prior Publication Data

US 2002/0092907 A1 Jul. 18, 2002

Related U.S. Application Data

(63) Continuation of application No. PCT/JP01/06251, filed on Jul. 18, 2001.

(30) Foreign Application Priority Data

Jul. 21, 2000 (JP) .................................... 2000-220842

(51) Int. Cl.[7] .............................. A63F 9/02; G06K 15/00
(52) U.S. Cl. .......................................... 235/383; 186/62
(58) Field of Search ................................. 235/379–383, 235/385, 462.1–462.49; 705/16, 17, 20–24; 186/59–63

(56) References Cited

U.S. PATENT DOCUMENTS

| | | | | |
|---|---|---|---|---|
| 5,250,789 A | * | 10/1993 | Johnsen | .................... 235/383 |
| 5,393,965 A | * | 2/1995 | Bravman et al. | ........... 235/383 |
| 5,600,121 A | * | 2/1997 | Kahn et al. | ............. 235/462.3 |
| 6,330,543 B1 | * | 12/2001 | Kepecs | ....................... 705/14 |

FOREIGN PATENT DOCUMENTS

| | | |
|---|---|---|
| JP | 02-067697 A | 3/1990 |
| JP | 09-305865 A | 11/1997 |

* cited by examiner

Primary Examiner—Michael G. Lee
Assistant Examiner—Jamara A. Franklin
(74) Attorney, Agent, or Firm—Frishauf, Holtz, Goodman & Chick, P.C.

(57) ABSTRACT

When a shopping container put on a counter is moved on this counter, a bar code scanner reads a bar code from bar code holding means mounted on the shopping container and outputs it to a cash register.

12 Claims, 6 Drawing Sheets

| SALES NUMBER | CUSTOMER IDENTIFICATION NUMBER | DATE | TIME | TOTAL SUM OF SALES |
|---|---|---|---|---|
| | | | | |
| | | | | |

41

| DETAILS NUMBER | SALES NUMBER | GOODS NUMBER | QUANTITY |
|---|---|---|---|
| | | | |
| | | | |

42

| GOODS NUMBER | GOODS CLASSIFICATION NUMBER | NAME | UNIT PRICE |
|---|---|---|---|
| | | | |
| | | | |

43

| CUSTOMER IDENTIFICATION NUMBER | NAME | ADDRESS | TELEPHONE NUMBER | DATE OF BIRTH | CUMULATIVE POINTS |
|---|---|---|---|---|---|
| | | | | | |
| | | | | | |

44

CUSTOMER MANAGEMENT SYSTEM

CROSS REFERENCE TO RELATED APPLICATIONS

This is a Continuation Application of PCT Application No. PCT/JP01/06251, filed Jul. 18, 2001, which was not published under PCT Article 21(2) in English.

This application is based upon and claims the benefit of priority from the prior Japanese Patent Applications No. 2000-220842, filed Jul. 21, 2000, the entire contents of which are incorporated herein by reference.

BACKGROUND OF THE INVENTION

1. Field of the Invention

The present invention relates to a customer management system, which performs customer management by utilizing a shopping container to be used exclusively for each customer.

2. Description of the Related Art

Conventionally, in order to perform customer management in a store such as a supermarket, a customer card with customer identification information recorded therein has been issued to each customer. More specifically, as shown in FIG. 12, known is a customer management system wherein a host computer 2 installed in back room etc. is connected to a cash register 1 serving as an accounting register through an inline cable 3, a card reader 4 is connected to the cash register 1, and a data base 5 consisting of a hard disk is connected to the host computer 2.

In this customer management system, there is provided a customer management file which manages customer information such as the name, address and the like of each customer, the sum total of settlement payment of the customer, etc. When a customer puts goods to purchase in a shopping container and goes to the cash register 1, a cashier requires the customer to show a customer card 6. On receiving the customer card 6 from the customer, the cashier has the card reader 4 read the customer identification information recorded in the customer card 6.

On receiving the customer identification information from the card reader 4, the cash register 1 transmits the information to the host computer 2 and makes inquiry thereto. The host computer 2 reads out corresponding management information of the customer from the customer management file of the data base 5 in accordance with the customer identification information transmitted from the cash register 1 and transmits the corresponding information to the cash register 1.

In this state, the cashier operates the cash register 1 to perform a process of registering goods which the customer is to purchase. When the process of registering all of the goods is completed, the cashier performs a settlement process to the customer on the basis of the total amount of money, receives money and then issues a receipt. In the cash register 1, the amount of this settlement is added to the sum total of settlement in the customer management information so as to update the customer management information. After updating, the cash register 1 transmits the updated customer management information to the host computer 2. The host computer 2 then updates the corresponding customer management information in the customer management file contained in the data base 5 on the basis of the received customer management information.

In addition, service has been provided to the customer by using the customer card 6 as a point card. That is, the cumulative points are also included in the customer management information managed in the customer management file of the data base 5, and service points are provided in accordance with the amount of settled money of the customer. The cumulative points are updated during the settlement, by adding service points to be provided this time to the points accumulated before. The cumulative points of the customer are indicated on a display for customers so as to inform the customer of his/her cumulative points. Assuming that, for example, customers can realize ten yen from one point. When the customer requests to use his or her service points, payment is made with the amount of money, which is obtained by subtracting the amount of money corresponding to the service points, which the customer intends to use, from the amount due.

However, in the system described above wherein the customer card is issued to each customer so as to perform customer management, customer management information cannot be updated if the customer forgets to bring the customer card with him or her, or the cashier forgets to ask the customer to present his or her customer card. In particular, when service points cannot be updated, some trouble may occur. In addition, with the system wherein a customer card is used, it causes some trouble for the customer to take out the card carried with him or her from his or her wallet etc., and hand the card over to the cashier. It also causes some trouble for the cashier to receive and make the card reader to read the customer card, and then return the card to the customer. Therefore, it takes time to perform a settlement process to one customer owing to this work. That may have customers wait for a long while, when the accounting register is crowded. As a result, there has been a problem in that customer service deteriorates.

An object of the present invention is to provide a customer management system, which causes no trouble to read customer identification information into an accounting register so that it is possible to read the information in a short time, and makes it further possible to perform a process based on the information constantly without fail.

BRIEF SUMMARY OF THE INVENTION

A customer management system according to the present invention is characterized by comprising: means for holding customer identification information, positioned in a shopping container exclusively used for each customer; means for detecting customer identification information, which is positioned near a check-out register to perform a process of registering sales to goods contained in the shopping container and detects customer identification information held in the customer identification information holding means; and means for obtaining settlement information, which obtains settlement information at the time of performing the process of registering sales at the check-out register for each customer who is specified on the basis of the customer identification information detected through the customer identification information detecting means.

According to the present invention, it causes no trouble to carry out the work of reading customer identification information into the accounting register so that it is possible to read the information in a short time. Furthermore, it is possible to carry out a process based on the customer identification information constantly without fail.

DETAILED DESCRIPTION OF THE INVENTION

In the following, embodiments of the present invention will be described below with reference to the accompanying drawings.

(First Embodiment)

Note that, the present embodiment will be described in a case where means for holding a bar code is used as means for holding customer identification information, and a bar code scanner is used as means for detecting customer identification information.

Figure 1:
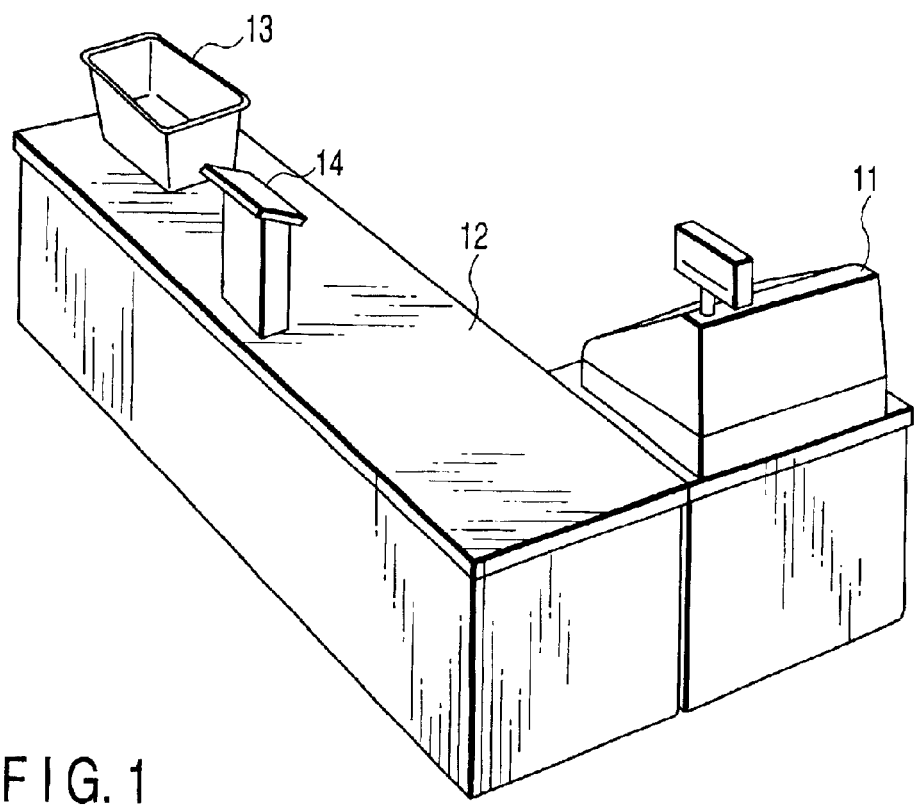
FIG. 1 is a perspective diagram showing a settlement section according to a first embodiment of the present invention.

FIG. 1 is a perspective diagram showing construction of a settlement section where goods to be purchased by a customer are registered and a settlement process is performed. The reference numeral 11 denotes a cash register serving as an accounting register. The reference numeral 12 denotes a counter provided near the cash register 11, whereon a shopping container 13 is put. In the middle of the counter 12, there is provided a bar code scanner 14 of stationary type, which is also a component of means for detecting customer identification information.

Figure 2:
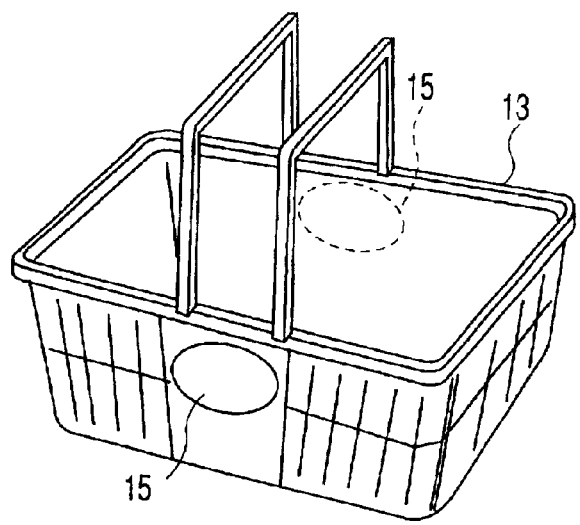
FIG. 2 is a diagram showing construction of a shopping container used in the first embodiment.

The shopping container 13 described above is a container for the exclusive use of one customer, which is made of plastic etc., and is owned by the customer. As shown in FIG. 2, the shopping container 13 has the same shape as a shopping container used in a store. On both outsides of the container, bar code holding means 15 serving as the customer identification information holding means are mounted. The bar code holding means 15 is a means for holding customer identification information with a bar code. The means 15 is made of materials having excellent durability, such as plastic, in which a bar code is embedded and the bar code can be read from the outside, a film on which a bar code is printed and the film is mounted on a plastic base, or the like.

Incidentally, stores using the shopping containers 13 of this sort have recently started to increase. Some volume sales stores selling foodstuffs abolish bags to put goods therein, which are consumed in large quantities, as a way of tackling problems related to the environment. The stores have customers purchase such shopping containers or lend them out. The customers keep the shopping containers. Coming to the stores, the customers always bring the containers with them.

Figure 3:
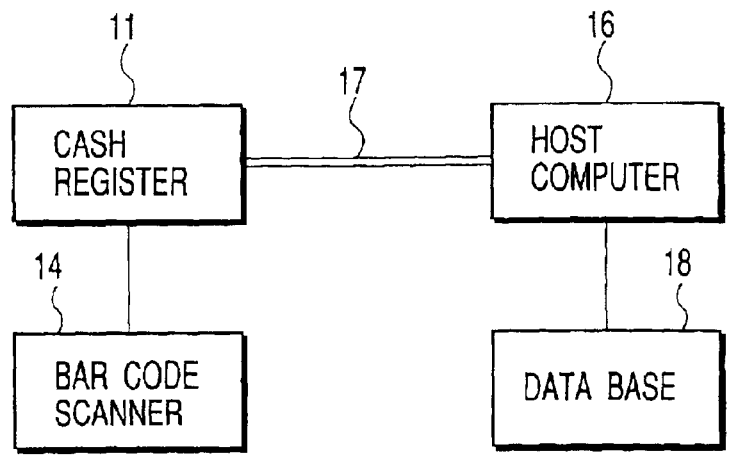
FIG. 3 is a block diagram showing construction of the entire system according to the first embodiment.

FIG. 3 is a block diagram showing construction of the entire system. In FIG. 3, the cash register 11 described above is connected in an inline manner through communication cable 17 to a host computer 16, which is installed in, for example, a back room. A data base 18 is connected to the host computer 16.

Figure 4:
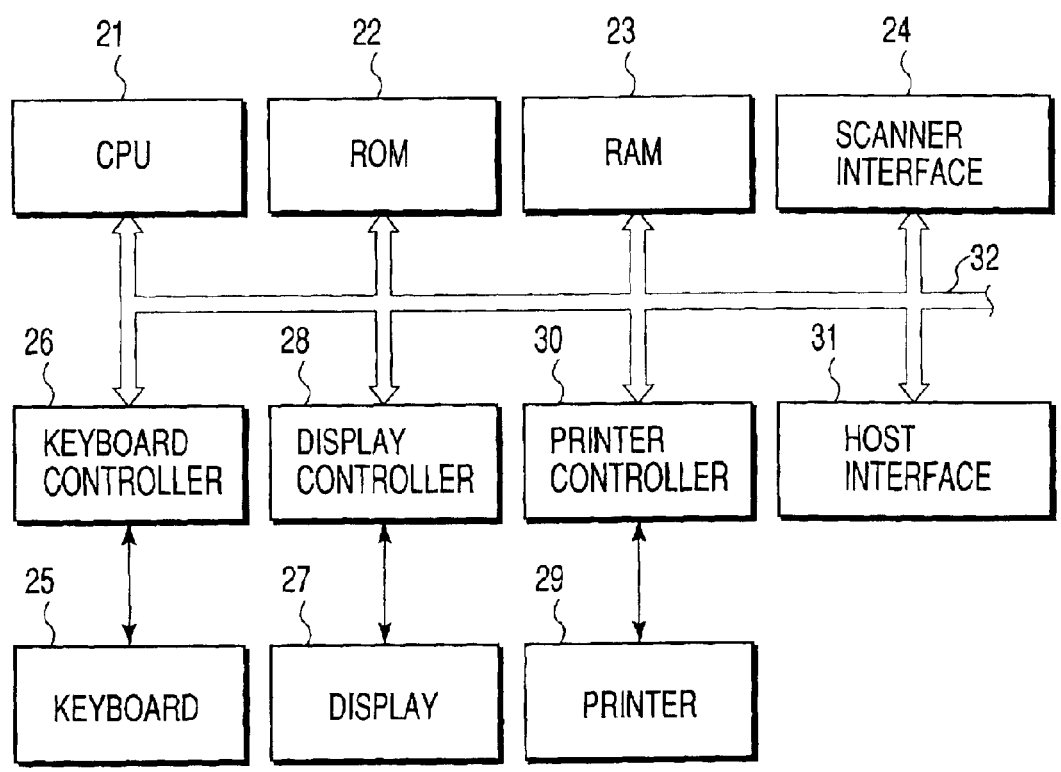
FIG. 4 is a block diagram showing construction of a cash register according to the first embodiment.

As shown in FIG. 4, the aforementioned cash register 11 comprises a CPU (Central processing unit) 21, a ROM (Read only memory) 22, a RAM (Random access memory) 23, a scanner interface 24, a keyboard controller 26, a display controller 28, a printer controller 30, a host interface 31, and the like. The CPU 21 constitutes a main control section. The ROM 22 stores program data through which the CPU controls each section of each section. There are provided a memory to perform a process of registering product sales data, memory used for a data process, or the like in the RAM 23. The scanner interface 24 is connected to the bar code scanner 14 and exchanges data and signals therewith. The keyboard controller 26 controls a keyboard 25 and takes key signals from the keyboard 25 in itself. The display controller 28 controls a display 27 and outputs display data to the display 27 so as to display thereon. The printer controller 30 controls a printer 29 and outputs print data to the printer 29 so as to print out. The host interface 31 is connected to the communication cable 17 and exchanges data and signals with the host computer 16.

The above-described CPU 21, ROM 22, RAM 23, scanner interface 24, keyboard controller 26, display controller 28, printer controller 30 and host interface 31 are electrically connected to each other through a bus line 32.

Figures 5, 6:
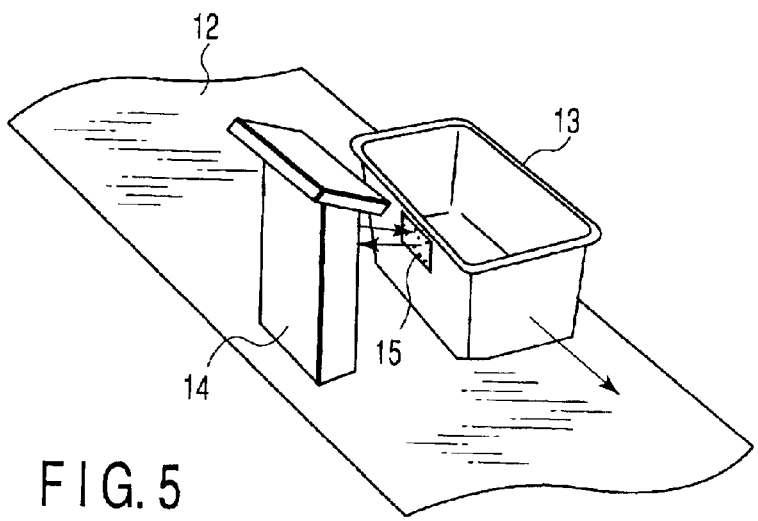
FIG. 5 is a diagram for explaining an operation of reading a bar code, performed through a bar code scanner in the first embodiment.
FIG. 6 is a diagram showing construction of a data base according to the first embodiment.

As shown in FIG. 5, the relationship between the bar code scanner 14 and the bar code holding means 15 of the shopping container 13 is arranged such that, when the shopping container 13 is moved on the counter 12 in the direction of the arrow shown in FIG. 5, the bar code scanner 14 reads a bar code of the bar code holding means 15. More specifically, the bar code scanner 14 is disposed on the counter 12 such that, when the shopping container 13 is moved on the counter 12, the bar code holding means 15 passes through the reading region of the bar code scanner 14.

As shown in FIG. 6, there are provided a sales file 41, a details file 42, merchandise master file 43 and customer master file 44 in the data base 18. In accordance with a sales number which is a consecutive number to be issued each time registration and settlement are performed through the cash register 11, the sales file 41 sequentially stores the relevant customer identification number, date, time and total sales amount (total amount of money). In accordance with a details number, which is a consecutive number to be issued each time goods is registered, the details file 42 sequentially stores a sales number, goods number and quantity. The merchandise master file 43 stores goods numbers, goods classification codes, goods names, and unit prices with respect to all goods sold. The customer master file 44 registers a customer identification number and stores the cumulative points of service points which have been presented to the relevant customer, together with customer information such as a customer's name, address, telephone number, date of birth, on the basis of the customer identification number.

According to this system, a customer comes to a store bringing the shopping container 13 with him or her. For example, a shopping container, which is one size smaller than the shopping container 13, is put in the container 13 so as to make the container double. Then the customer goes around the store and puts goods to purchase in the store's shopping container. Finally, the customer comes to the settlement section for settlement and puts the doubled shopping container near end of the counter 12.

A cashier in the store moves the doubled container on or above the counter 12 so as to pass it through in front of the bar code scanner 14. At this time, the bar code scanner 14 reads a bar code from the bar code holding means 15 mounted on the outside of the customer's shopping container 13. The bar code holds customer identification information and the bar code scanner 14 decodes the read bar code and converts the decoded code into a customer identification number, and then supplies the number to the cash register 11.

On receiving the customer identification number from the bar code scanner 14, the cash register 11 transmits the received number to the host computer 16. On receiving the transmitted number, the host computer 16 retrieves in the customer master file 44 of the data base 18 and reads the cumulative points of the corresponding customer identification number, and then transmits the read points to the cash register 11. On receiving the transmitted cumulative points, the cash register 11 stores the points in a predetermined memory of the RAM 23. At this time, the cash register 11 also issues a sales number.

After passing the doubled container through in front of the bar code scanner 14, the cashier pulls out the store's shopping container with goods left therein and returns the pulled out container on the end of the counter 12. Then, the cashier performs some jobs, such as taking out goods from the store's shopping container, having the bar code scanner 14 read a bar code provided on the goods, and then putting goods whose bar code has been read in the customer's shopping container 13.

The bar code scanner 14 decodes the read bar code, converts the decoded code into a goods number, and supplies the number to the cash register 11. On receiving the goods number from the bar code scanner 14, the cash register 11 transmits the number to the host computer 16. On receiving the goods number, the host computer 16 retrieves in the merchandise master file 43 of the data base 18, reads the goods classification code, name and unit price of the corresponding goods number, and then transmits them to the cash register 11. On receiving the transmitted goods classification code, name and unit price of the corresponding goods number, the cash register 11 stores them in a predetermined memory of the RAM 23.

The cash register 11 performs a register process on the basis of the goods number, goods classification code, unit price and quantity and issues a details number. Then the cash register 11 transmits the respective data, such as the details number, sales number, goods number and quantity to the host computer 16. On receiving the data, the host computer 16 stores the received data in the details file 42 of the data base 18. In addition, the cash register 11 indicates the amount of money on the display 27, and prints the names, unit price and quantity on a receipt through the printer 29.

The process described above is repeated each time the bar code scanner 14 reads a bar code.

When register processes end with respect to the all goods which the customer is to purchase, the cashier performs a total operation through the keyboard 25. With this total operation, the CPU 21 of the cash register 11 calculates the total amount of money and indicates it on the display 27. The customer pays in accordance with the displayed total amount, and the cashier operates the keyboard 25 so as to perform a closing operation of registering.

With this operation, the CPU 21 of the cash register 11 assumes that the calculated total amount is the customer's total sum of sales. On the basis of the total sum, the CPU 21 performs an operation to give service points equivalent to, for example, five per cent of the total sum. Then the CPU adds the calculated service points to the customer's cumulative points and updates it. (Means for providing service points)

After that, the CPU 21 transmits the respective data to the host computer 16, the data such as a sales number, customer identification number, date and time read from built-in clock means, total sum of sales and cumulative points.

On receiving the data, the host computer 16 stores the respective data including the sales number, customer identification number, date, time and total sum of sales, in the sales file 41 of the data base 18. (Means for obtaining settlement information)

In addition, the host computer 16 rewrites the cumulative points of the corresponding customer identification number in the customer master file 44 of the data base 18 to the received cumulative points.

Additionally, the cash register 11 prints the total amount of money, provided service points, updated cumulative points, amount of payment and amount of change on a receipt through the printer 29 and issues the receipt.

When the customer intends to apply his or her cumulative points to payment, after calculating the total amount of money, the cash register 11 converts points to be applied to the payment into the amount of money and indicates the amount on the display 27. Furthermore, the cash register 11 indicates the amount of money, which is obtained by subtracting the indicated amount from the total amount of money, as an amount of payment. Then, the cash register 11 subtracts the points to be applied to payment from the cumulative points. For example, when all of the cumulative points are applied to payment, the cumulative points become zero. Service points provided in accordance with the amount which the customer paid this time become new cumulative points.

At last, the customer receives the receipt from the cashier and leaves the store, taking his or her own shopping container 13 with the purchased goods therein.

In such a system, a customer surely brings his or her own shopping container 13 so as to put goods therein, so that he or she will never forget to bringing, unlike a customer card. If the cashier only carries out work to move the shopping container 13 put on the end of the counter 12 in a manner of passing the container in front of the bar code scanner 14, the bar code scanner 14 reads a bar code from the bar code holding means 15 mounted on the shopping container 13 so as to take in the customer identification number. It is not needed for the cashier to carry out the troublesome tasks required in the case of using a customer card, such as receiving the customer card from the customer, having the card reader read the card and returning it to the customer separately from the job of registering goods. Therefore, it is possible to read customer identification information promptly in a short time. As a result, a settlement process with the customer can be carried out smoothly. In addition, the problem does not occur in which the cashier forgets to require the customer to present his or her customer card.

Note that, the embodiment has been described in a case where in that the bar code scanner to read the bar code from the bar code holding means 15 of the shopping container 13 also serves as one to read the bar code provided on goods in a register process. However it is not limited to such a case.

Figure 7:
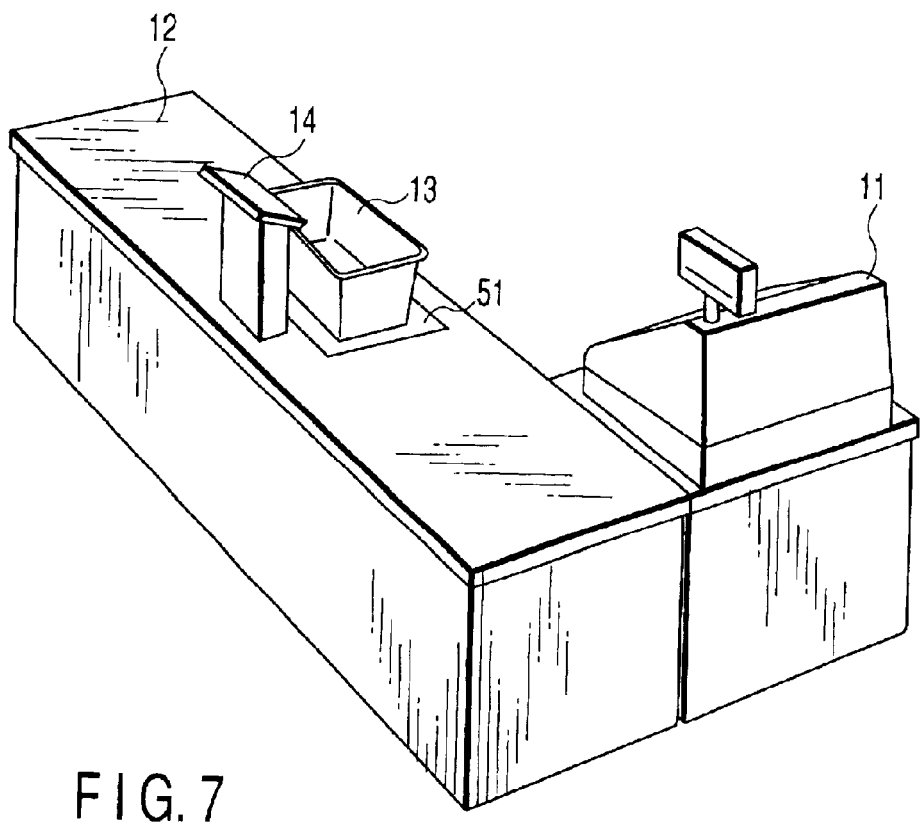
FIG. 7 is a diagram showing another layout example of the bar code scanner according to the first embodiment.
Figure 8:
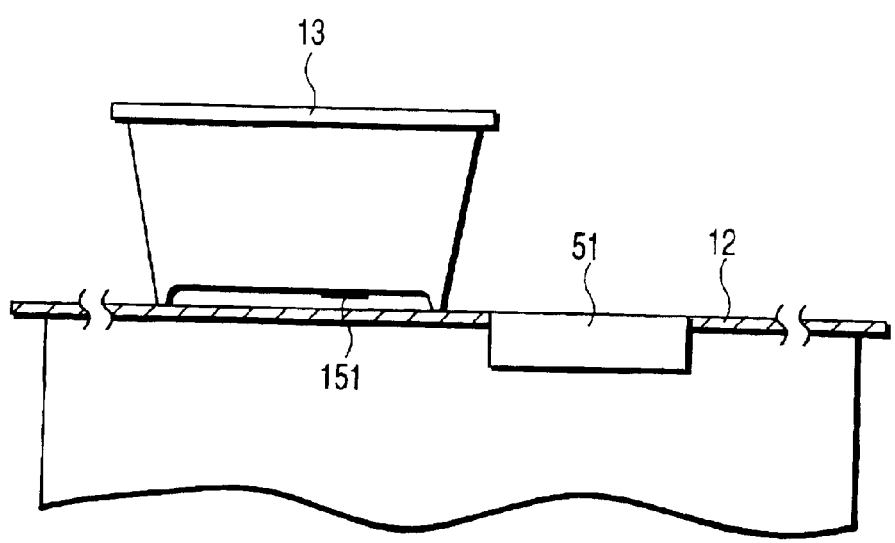
FIG. 8 is a diagram showing a positional relationship between the bar code scanner shown in FIG. 7 and a bar code holding means.

For example, it may be arranged as follows. As shown in FIG. 7, another stationary type bar code scanner 51 is embedded in the upper surface of the counter 12, which is the same area as the bar code scanner 14. A bar code holding means 151 is mounted on the underbody of the shopping container 13 as shown in FIG. 8. When the shopping container 13 moves on or above the counter 12, the bar code scanner 51 reads a bar code from the bar code holding means 151.

Figure 9:
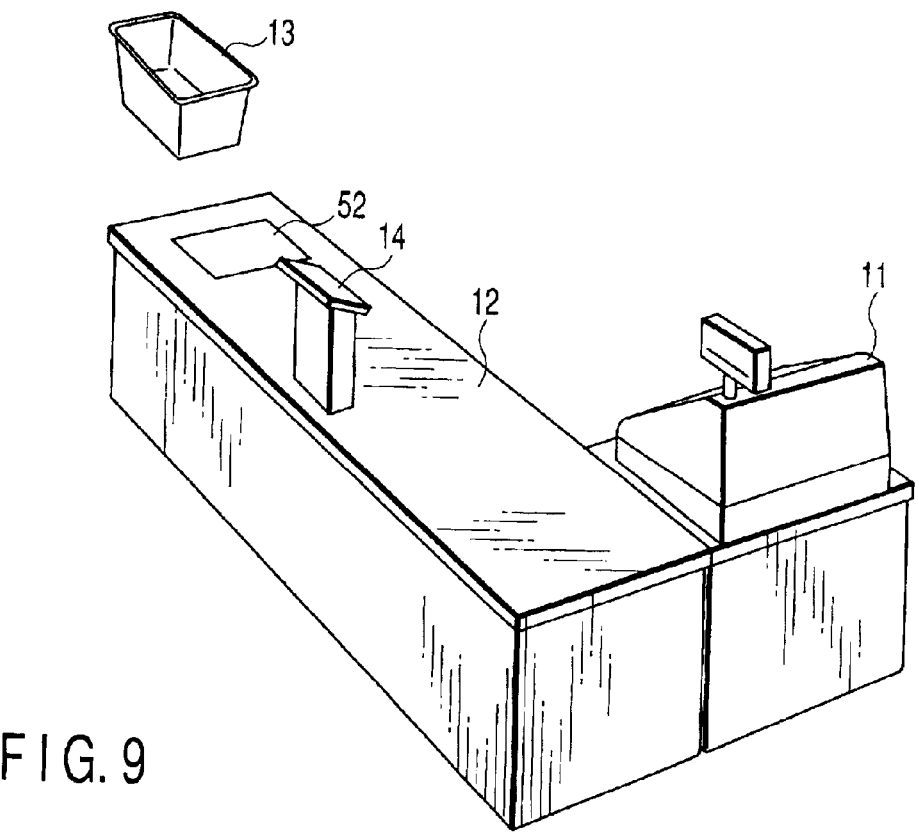
FIG. 9 is a diagram showing the other layout of the bar code scanner according to the first embodiment.
Figure 10:
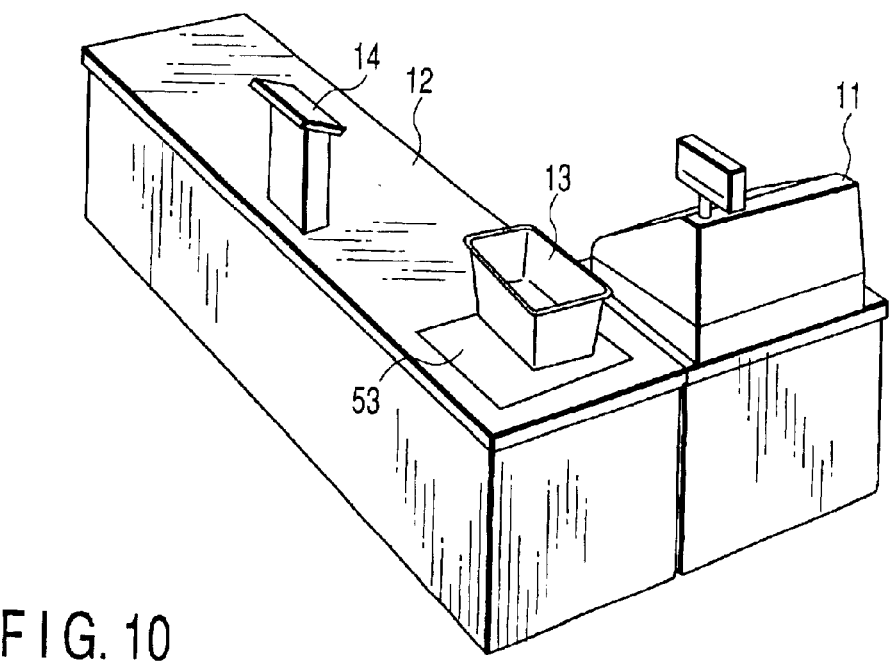
FIG. 10 is a diagram showing the still other layout of the bar code scanner according to the first embodiment.

In addition, it may be arranged as follows. That is, as shown in FIG. 9, a designated region is arranged at the end of the counter 12 on which a customer puts the shopping container 13 with goods therein. A stationary type bar code scanner 52 is embedded in the designated region. The customer puts the shopping container 13 on the designated region, so that the bar code scanner 52 reads a bar code from the bar code holding means 151 mounted on the underbody of the shopping container 13. It may also be arranged as follows. That is, as shown in FIG. 10, a designated region is arranged at the other end of the counter 12, whereon the cashier puts an empty shopping container 13. A stationary type bar code scanner 53 is embedded in the designated region. The cashier moves and puts the shopping container 13 on the designated region, so that the bar code scanner 53 reads a bar code from the bar code holding means 151 mounted on the underbody of the shopping container 13.

(Second Embodiment)

Note that, the present embodiment will be described in the case where a radio tag is used as the means for holding customer identification information, and a radio tag reader is used as the means for detecting customer identification information. Incidentally, sections identical to the aforementioned first embodiment are marked with identical symbols, and detailed descriptions will be omitted.

Figure 11:
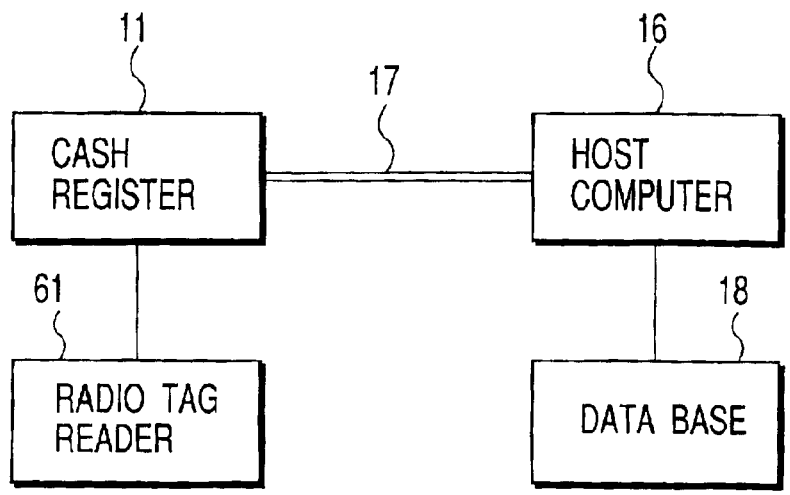
FIG. 11 is a block diagram showing construction of the entire system according to a second embodiment of the present invention.
Figure 12:
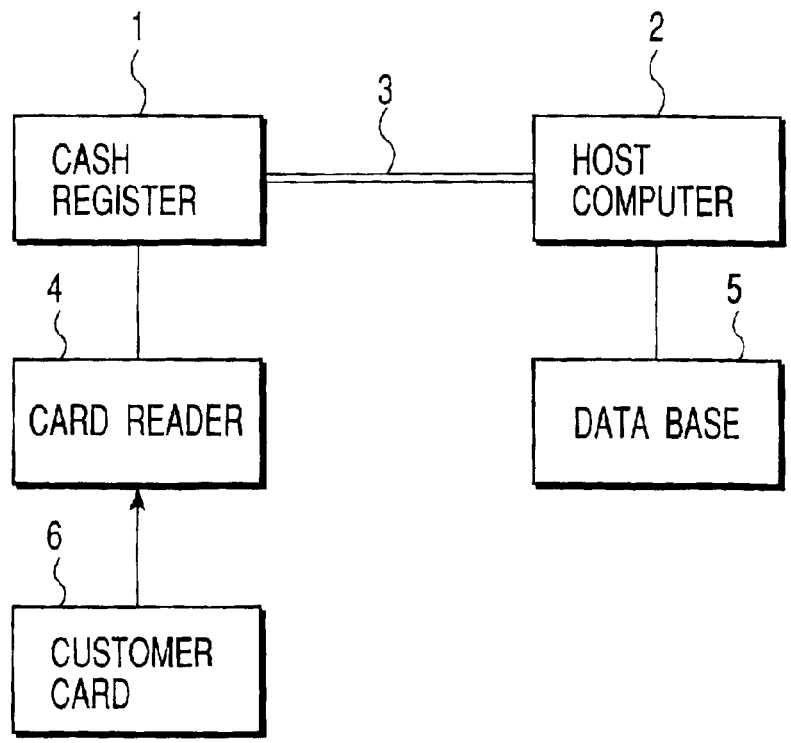
FIG. 12 is a block diagram showing a conventional example.

As shown in FIG. 11, a radio tag reader 61 is connected to the cash register 11 instead of the bar code scanner. The radio tag is mounted on the underbody of the shopping container 13 in the same manner as the bar code holding means 151 shown in FIG. 8. The other arrangement is the same as one according to the aforementioned first embodiment.

The radio tag reader 61 is arranged being embedded in the upper surface of the counter 12. The position in which the radio tag reader 61 is embedded may be the same position as the bar code scanner according to the first embodiment. That is, the position may be located in the center portion where the shopping container 13 moves over as shown in FIG. 7, or arranged at the end portion whereon the customer puts the shopping container as shown in FIG. 9, or may also be arranged at the other end portion whereon the cashier puts the moved shopping container 13 as shown in FIG. 10.

Inside the radio tag, there are incorporated a memory, radio section and antenna. In the memory, a customer identification number, which is customer identification information, is stored.

The radio tag reader 61 transmits radio waves to the radio tag in a case where the radio tag exists near the reader, so as to have the radio tag operate. Starting to operate, the radio tag transmits the customer identification number to the radio tag reader 61 by radio. The radio tag reader 61 receives the customer identification number the radio tag.

As described above, even if the system is arranged in that the radio tag reader 61 is embedded in the counter 12, and the radio tag is mounted on the underbody of the shopping container 13, it is possible that the cash register 11 can obtain the customer identification number from the radio tag reader 61 in the same manner as one according to the first embodiment, when the shopping container 13 moves on or above the counter 12, the customer puts the shopping container 13 on the counter, or the cashier moves the shopping container 13 and stops it at the predetermined position. The operation in the process of registering goods after obtaining the customer identification number is the same as one according to the first embodiment.

Thus, an operational effect similar to that achieved in the first embodiment can be obtained in the present embodiment.

Note that, the respective embodiments described above are described in the case where service points are provided on the basis of the total sum of sales. However, the system is not limited to such a case. It may be arranged that service points be provided each time the customer comes to the store and carries out a settlement regardless of the total sum of sales. That is, service points may be provided in accordance with the number of customers who come to the store.

As described above in detail, according to the invention, it does not take a lot of time and energy to read the customer identification information into the accounting register so that the process of reading the customer identification information can be carried out in a short time. In addition, processes based on the customer identification information can always be performed without fail. Furthermore, it is possible to read customer identification information without any contact, so that the durability of the reading section can be improved.

As described above, the invention is effective in the technical field of managing customer management information in stores such as supermarkets, etc.

What is claimed is:

1. A customer management system comprising:
    bar code holding means, provided on a side surface of a customer-specific shopping container for use by a specific customer, for holding customer identification information;
    a counter on which the customer-specific shopping container is to be put;
    a bar code scanner for detecting the customer identification information held by the bar code holding means, and for detecting a bar code of goods taken out from the customer-specific shopping container, wherein the bar code scanner is provided on the counter at a position which enables the bar code holding means to pass through a region of the bar code scanner when the customer-specific shopping container is moved over the counter;
    an accounting register for performing settlement processing of the goods; and
    settlement information obtaining means for obtaining settlement information from the accounting register with respect to the customer identified by the customer identification information detected by the bar code scanner;
    wherein the bar code scanner detects the customer identification information held by the bar code holding means when the customer-specific shopping container passes in front of the bar code scanner in a manner such that the bar code holding means faces the bar code scanner.

2. The customer management system according to claim 1, wherein the customer-specific shopping container is adapted to hold therein a non-customer-specific shopping container, and the bar code scanner detects a bar code of goods taken out from the non-customer-specific shopping container.

3. A customer management system comprising:

bar code holding means, provided on a bottom surface of a specific shopping container used for a specific customer, for holding customer identification information;

a counter on which the shopping container is to be put;

a first bar code scanner for detecting the customer identification information held by the bar code holding means;

a second bar code scanner, provided on the counter, for detecting a bar code of goods taken out from the shopping container;

an accounting register for performing settlement processing of the goods; and settlement information obtaining means for obtaining settlement information from the accounting register with respect to the customer identified by the customer identification information detected by the first bar code scanner;

wherein the first bar code scanner is embedded in the counter such that the bar code holding means of the shopping container passes through a reading region of the first bar code scanner when the shopping container is moved over the counter.

4. The customer management system according to claim 3, wherein the first bar code scanner is embedded in a designated position on the counter such that the bar code holding means of the shopping container is located within the reading region of the first bar code scanner when the shopping container is placed in the designated position on the counter.

5. A customer management system comprising:

a radio tag, provided on a bottom surface of a specific shopping container used for a specific customer, for holding customer identification information;

a counter on which the shopping container is to be put;

a radio tag reader for detecting the customer identification information held by the radio tag;

a bar code scanner, provided on the counter, for detecting a bar code of goods taken out from the shopping container;

an accounting register for performing settlement processing of the goods; and settlement information obtaining means for obtaining settlement information from the accounting register with respect to the customer identified by the customer identification information detected by the radio tag reader;

wherein the radio tag reader is embedded in the counter such that the radio tag of the shopping container passes through a reading region of the radio tag reader when the shopping container is moved over the counter.

6. The customer management system according to claim 5, wherein the radio tag reader is embedded in a designated position on the counter such that the radio tag of the shopping container is located within the reading region of the radio tag reader when the shopping container is placed in the designated position on the counter.

7. A customer management system comprising:

bar code holding means, provided on a side surface of a customer-specific shopping container for use by a specific customer, for holding customer identification information;

a counter on which the customer-specific shopping container is to be put;

a bar code scanner for detecting the customer identification information held by the bar code holding means, and for detecting a bar code of goods taken out from the customer-specific shopping container, wherein the bar code scanner is provided on the counter at a position which enables the bar code holding means to pass through a region of the bar code scanner when the customer-specific shopping container is moved over the counter;

an accounting register for performing settlement processing of the goods; and service point providing means for providing service points to the customer identified by the customer identification information detected by the bar code scanner;

wherein the bar code scanner detects the customer identification information held by the bar code holding means when the customer-specific shopping container passes in front of the bar code scanner in a manner such that the bar code holding means faces the bar code scanner.

8. The customer management system according to claim 7 wherein the customer-specific shopping container is adapted to hold therein a non-customer-specific shopping container, and the bar code scanner detects a bar code of goods taken out from the non-customer-specific shopping container.

9. A customer management system comprising:

bar code holding means, provided on a bottom surface of a specific shopping container used for a specific customer, for holding customer identification information;

a counter on which the shopping container is to be put;

a first bar code scanner for detecting the customer identification information held by the bar code holding means;

a second bar code scanner, provided on the counter, for detecting a bar code of goods taken Out from the shopping container;

an accounting register for performing settlement processing of the goods; and service point providing means for providing service points to the customer identified by the customer identification information detected by the first bar code scanner;

wherein the first bar code scanner is embedded in the counter such that the bar code holding means of the shopping container passes through a reading region of the first bar code scanner when the shopping container is moved over the counter.

10. The customer management system according to claim 9, wherein the first bar code scanner is embedded in a designated position on the counter such that the bar code holding means of the shopping container is located within the reading region of the first bar code scanner when the shopping container is placed in the designated position on the counter.

11. A customer management system comprising:

a radio tag, provided on a bottom surface of a specific shopping container used for a specific customer, for holding customer identification information;

a counter on which the shopping container is to be put;

a radio tag reader for detecting the customer identification information held by the radio tag;

a bar code scanner, provided on the counter, for detecting a bar code of goods taken out from the shopping container;

an accounting register for performing settlement processing of the goods; and service point providing means for providing service points to the customer identified by the customer identification information detected by the radio tag reader;

wherein the radio tag reader is embedded in the counter such that the radio tag of the shopping container passes through a reading region of the radio tag reader when the shopping container is moved over the counter.

12. The customer management system according to claim 11, wherein the radio tag reader is embedded in a designated position on the counter such that the radio tag of the shopping container is located within the reading region of the radio tag reader when the shopping container is placed in the designated position on the counter.

* * * * *